United States Patent
Yoshida et al.

(10) Patent No.: US 12,060,021 B2
(45) Date of Patent: Aug. 13, 2024

(54) DRIVING CONTROL DEVICE

(71) Applicant: DENSO CORPORATION, Kariya (JP)

(72) Inventors: Airi Yoshida, Kariya (JP); Kazumasa Sakurai, Nisshin (JP); Naohito Takasuka, Nisshin (JP)

(73) Assignee: DENSO CORPORATION, Kariya (JP)

( * ) Notice: Subject to any disclaimer, the term of this patent is extended or adjusted under 35 U.S.C. 154(b) by 329 days.

(21) Appl. No.: 17/467,353

(22) Filed: Sep. 6, 2021

(65) Prior Publication Data

US 2022/0001821 A1 Jan. 6, 2022

Related U.S. Application Data

(63) Continuation of application No. PCT/JP2020/007400, filed on Feb. 25, 2020.

(30) Foreign Application Priority Data

Mar. 7, 2019 (JP) .................. 2019-041836

(51) Int. Cl.
*B60R 21/0134* (2006.01)
*B60R 21/0132* (2006.01)
*B60R 21/0136* (2006.01)
*B60R 21/232* (2011.01)

(52) U.S. Cl.
CPC ...... *B60R 21/0134* (2013.01); *B60R 21/0132* (2013.01); *B60R 21/0136* (2013.01); *B60R 21/232* (2013.01)

(58) Field of Classification Search
None
See application file for complete search history.

(56) References Cited

U.S. PATENT DOCUMENTS

| | | | | |
|---|---|---|---|---|
| 2005/0107933 A1* | 5/2005 | Kuroda | ............... | B60R 21/0133 701/45 |
| 2009/0138160 A1* | 5/2009 | Lyoda | ................. | B60R 21/0136 701/45 |
| 2011/0040452 A1* | 2/2011 | Tsunekawa | ......... | B60R 21/0134 701/45 |
| 2020/0001813 A1* | 1/2020 | Akaba | ............... | B60R 21/01554 |

FOREIGN PATENT DOCUMENTS

| | | |
|---|---|---|
| JP | 2003-095058 A | 4/2003 |
| JP | 2006-160066 A | 6/2006 |
| JP | 2009-073207 A | 4/2009 |
| JP | 2017-202802 A | 11/2017 |

\* cited by examiner

*Primary Examiner* — Christian Chace
*Assistant Examiner* — Shayne M. Gilbertson
(74) *Attorney, Agent, or Firm* — MASCHOFF BRENNAN

(57) ABSTRACT

A driving control device is configured to control driving of occupant protection devices to be mounted on a vehicle. The driving control device includes a detection result acquisition unit, a collision form estimation unit, and a device selection unit. The detection result acquisition unit acquires a detection result of an object ahead of the vehicle before collision. The collision form estimation unit estimates a form of collision that may occur with the object based on the detection result. When a collision between the vehicle and the object is detected, the device selection unit selects which of the occupant protection devices should be driven based on the collision form estimated by the collision form estimation unit.

6 Claims, 7 Drawing Sheets

DRIVING CONTROL DEVICE

CROSS-REFERENCE TO RELATED APPLICATION

This application is the U.S. bypass application of International Application No. PCT/JP2020/007400 filed on Feb. 25, 2020 which designated the U.S. and claims priority to Japanese Patent Application No. 2019-041836 filed on Mar. 7, 2019, the contents of both of which are incorporated herein by reference.

TECHNICAL FIELD

The present disclosure relates to a driving control device for controlling driving of an occupant protection device mounted on a vehicle.

BACKGROUND

The vehicle described in JP 2006-160066 A includes a right curtain airbag, a left curtain airbag, a driver's seat airbag, a passenger's seat airbag, an electric control device, a right front collision sensor, and a left front collision sensor. The right front collision sensor is an acceleration sensor that detects acceleration in the longitudinal direction, and is attached around the frontmost part of a right side-member. The left front collision sensor is an acceleration sensor that detects acceleration in the longitudinal direction, and is attached around the frontmost part of a left side-member.

In the event of an offset collision, the electrical control device controls the deployment of the right or left curtain airbag. Specifically, when the left front collision sensor detects a longitudinal acceleration that is equal to or greater than a predetermined reference value and the right front collision sensor does not detect a longitudinal acceleration that is equal to or greater than a predetermined reference value, the left curtain airbag is deployed. Similarly, when the right front collision sensor detects a longitudinal acceleration that is equal to or greater than a predetermined reference value and the left front collision sensor does not detect a longitudinal acceleration that is equal to or greater than a predetermined reference value, the right curtain airbag is deployed.

SUMMARY

According to one aspect, a driving control device is configured to control driving of occupant protection devices configured to be mounted on a vehicle. The driving control device includes a detection result acquisition unit which acquires a detection result of an object ahead of the vehicle before collision, a collision form estimation unit which estimates a form of collision that may occur with the object based on the detection result, an acceleration acquisition unit which calculates an estimate of acceleration acting on the vehicle when the vehicle collides with the object based on the detection result and a device selection unit which, when a collision between the vehicle and the object is detected, selects which of the occupant protection devices should be driven based on the collision form estimated by the collision form estimation unit. The driving control device is configured to drive at least one of the occupant protection devices when the estimated value calculated by the acceleration acquisition unit exceeds a collision detecting threshold.

BRIEF DESCRIPTION OF THE DRAWINGS

The above objects and other objects, features and advantages of the present disclosure will be made clearer by the following detailed description, given referring to the appended drawings. In the accompanying drawings.

DETAILED DESCRIPTION OF THE PREFERRED EMBODIMENTS

Figure 1:
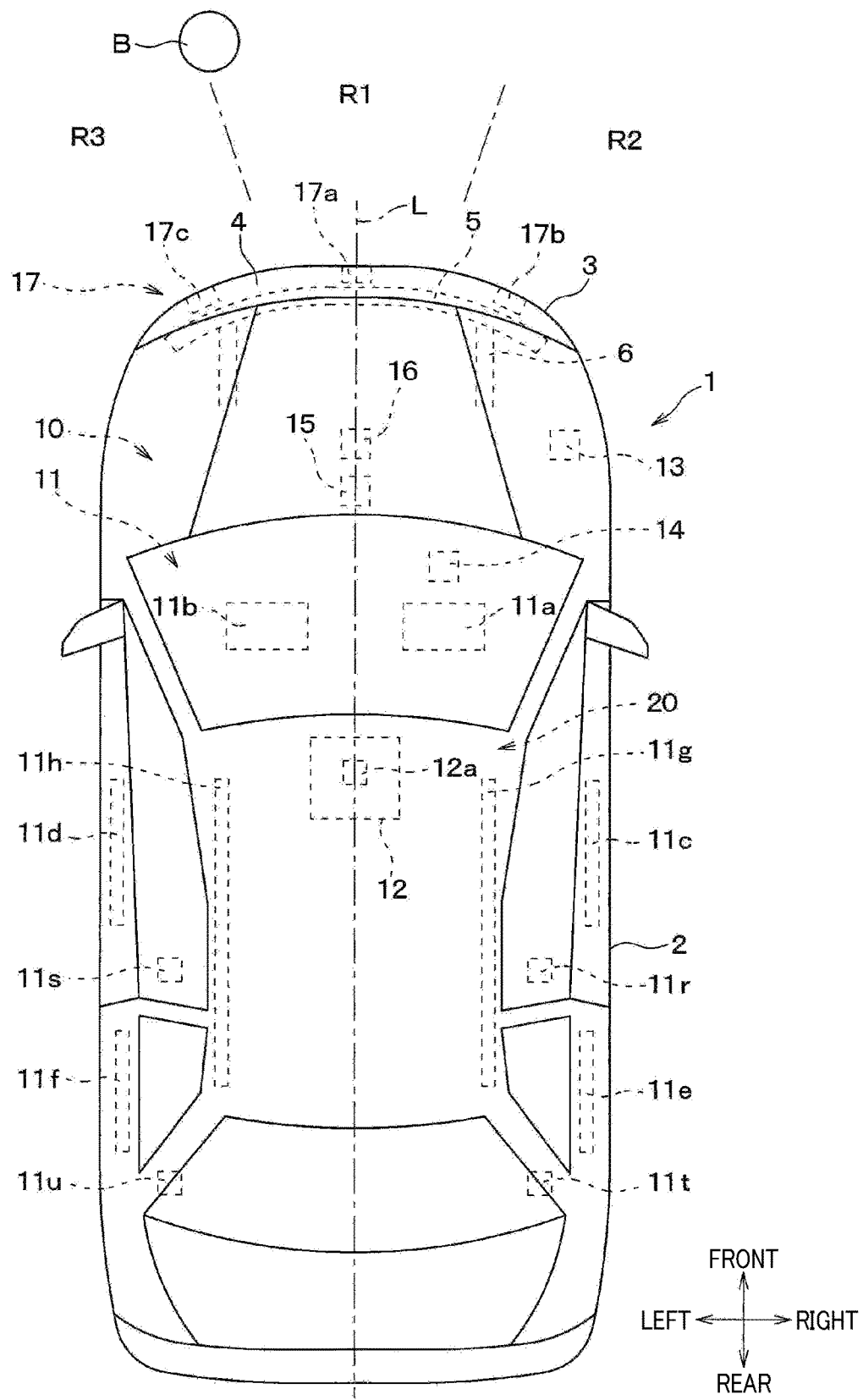
FIG. 1 is a plan view showing the general configuration of a vehicle to which an embodiment has been applied.

It is desirable that these kinds of device and method described in JP 2006-160066 A can carry out improved driving control of the occupant protection devices. The present disclosure has been devised in view of the above-exemplified circumstances and the like.

According to one aspect, a driving control device is configured to control driving of occupant protection devices configured to be mounted on a vehicle. The driving control device includes a detection result acquisition unit which acquires a detection result of an object ahead of the vehicle before collision, a collision form estimation unit which estimates a form of collision that may occur with the object based on the detection result, an acceleration acquisition unit which calculates an estimate of acceleration acting on the vehicle when the vehicle collides with the object based on the detection result and a device selection unit which, when a collision between the vehicle and the object is detected, selects which of the occupant protection devices should be driven based on the collision form estimated by the collision form estimation unit. The driving control device is configured to drive at least one of the occupant protection devices when the estimated value calculated by the acceleration acquisition unit exceeds a collision detecting threshold.

According to yet another aspect, a driving control device is configured to control driving of an occupant protection device to be mounted on a vehicle. The driving control device includes a detection result acquisition unit which acquires a detection result of an object ahead of the vehicle before collision, an acceleration acquisition unit which calculates an estimate of acceleration acting on the vehicle when the vehicle collides with the object based on the detection result, and a driving control device which drives the occupant protection device when the estimated value calculated by the acceleration acquisition unit exceeds a collision detecting threshold. The acceleration acquisition unit calculates the estimated value based on the detection result acquired using a first millimeter wave radar sensor as the electromagnetic wave radar sensor corresponding to a first region in front of the vehicle, a second millimeter wave radar sensor as the electromagnetic wave radar sensor corresponding to a second region on one side of the first region in a vehicle width direction, and a third millimeter wave radar sensor as the electromagnetic wave radar sensor corresponding to a third region on the other side of the first region in the vehicle width direction.

The present application may contain reference signs assigned to components. The reference signs each indicate only an example of the correspondence between the component and a specific configuration described in connection with an embodiment described later. Therefore, the present disclosure is not limited by the reference signs.

EMBODIMENTS

An embodiment will be described below with reference to the drawings. Note that various modifications applicable to an embodiment will be described all together after explaining the embodiment, as it may interfere with the understanding of the embodiment if they are inserted in the middle of the description of the embodiment.

[General Configuration of Vehicle]

First, the general configuration of a vehicle 1, to which the embodiment is applied, will be described with reference to FIG. 1. The concepts of longitudinal (back), left, and right with regard to the vehicle 1 are as shown by the arrows in FIG. 1 and other figures. That is, it is assumed that the concepts of longitudinal, left, and right is set based on the normal sitting posture of an occupant seated in the driver's seat of the vehicle 1.

In addition, various directions are defined as follows. The longitudinal direction parallel to the vehicle center line L is referred to as vehicle overall length direction. The left-right direction orthogonal to the vehicle overall length direction is referred to as vehicle width direction. The direction orthogonal to the vehicle overall length direction and the vehicle width direction, that is, the vertical direction is referred to as vehicle height direction. The vehicle height direction is substantially parallel to the direction in which the gravity force acts when the vehicle 1 is placed on horizontal ground. Viewing the components of the vehicle 1 on a horizontal ground from right above the vehicle 1 along the vehicle height direction will be referred to as plan view. Viewing the components of the vehicle 1 from in front of the vehicle 1 along the vehicle overall length direction of the vehicle will be referred to as front view.

The vehicle 1 is a so-called automobile and has a box-shaped vehicle body 2. A front bumper 4 is attached to the front surface 3 of the vehicle body 2. Inside the front bumper 4, a reinforcing member 5 called a bumper reinforcement is provided. The reinforcing member 5 is a rod-shaped member extending in the vehicle width direction in a front view, and it is curved such that it has an arc part that is protruded forward in a plan view. The reinforcing member 5 is fixed to the front ends of a pair of side members 6 extending forward. In the present embodiment, each side member 6 extends substantially parallel to the vehicle overall length direction.

[Occupant Protection System]

The vehicle 1 is provided with an occupant protection system 10. The occupant protection system 10 is configured to protect the occupant(s) of the vehicle 1 by occupant protection devices 11 when an object B existing outside the vehicle 1 collides with the vehicle 1. The object B is, for example, another vehicle, a wall, a pole, or the like.

The vehicle 1 is provided with a plurality of occupant protection devices 11. Specifically, corresponding to the front seats, a driver's seat front airbag 11a, a passenger's seat front airbag 11b, a driver's seat side airbag 11c, and a passenger's seat side airbag 11d are provided. The driver's seat front airbag 11a is provided to be deployed in front of the upper body of the occupant seated in the driver's seat. The passenger's seat front airbag 11b is provided to be deployed in front of the upper body of the occupant seated in the passenger's seat. The driver's seat side airbag 11c is provided to be deployed on one side of the occupant seated in the driver's seat. The passenger's seat front airbag 11d is provided to be deployed on one side of the occupant seated in the passenger's seat.

Further, in the present embodiment, the vehicle 1 is equipped with further occupant protection devices 11, namely, a right rear seat side airbag 11e, a left rear seat side airbag 11f, a right curtain airbag 11g, and a left curtain airbag 11h. The right rear seat side airbag 11e is provided to be deployed on one side of the occupant seated in the right rear seat. The left rear seat side airbag 11f is provided to be deployed on one side of the occupant seated in the left rear seat. The right curtain airbag 11g is provided to be deployed downward on one side of the occupants seated in the driver's seat and the right rear seat. The left curtain airbag 11h is provided to be deployed downward on one side of the occupants seated in the passenger's seat and the left rear seat.

Further, in the present embodiment, the vehicle 1 is equipped with further occupant protection devices 11, namely, a driver's seat pretensioner 11r, a passenger's seat pretensioner 11s, a right rear seat pretensioner 11t, and a left rear seat pretensioner 11u. The driver's seat pretensioner 11r, the passenger's seat pretensioner 11s, the right rear seat pretensioner 11t, and the left rear seat pretensioner 11u are so-called belt pretensioner mechanisms. They are configured to restrain the occupant to the seat by applying a tension equal to or greater than a predetermined value to the seat belt of each seat. A belt winding mechanism included in, for example, the driver's seat pretensioner 11r has a well-known reversible or irreversible configuration.

[Control System]

Next, a system configuration for controlling the operation of the occupant protection system 10 will be described. The occupant protection system 10 includes a driving control device 12 in addition to the multiple occupant protection devices 11 described above. The driving control device 12 is an in-vehicle microcomputer which may also be referred to as an airbag ECU or a protection device ECU, and it is configured to control the driving of the occupant protection device 11. ECU is an abbreviation for Electronic Control Unit. The driving control device 12 is connected to each of the occupant protection devices 11 via an in-vehicle safety system network conforming to a certain communication standard such as DSI3. DSI3 is an abbreviation for Distributed System Interface 3.

The driving control device 12 includes a CPU, ROM, RAM, and non-volatile RAM (not shown). The non-volatile RAM is, for example, a flash ROM or the like.

The driving control device 12 is configured such that various control operations can be realized by the CPU reading and executing programs from the ROM or the non-volatile RAM. Further, various data used when the programs are executed are stored in advance in the ROM or the non-volatile RAM. The various data include, for example, initial values, lookup tables, maps, and the like. The RAM is provided so as to temporarily store calculation results, data input from the outside, and the like when the CPU executes programs. The details of the functional configuration of the driving control device 12 will be described later.

The driving control device 12 has a box-shaped housing and positioned on the vehicle center line L in a plan view. The driving control device 12 includes a built-in collision sensor 12*a* inside the housing. The built-in collision sensor 12*a* is a collision sensor built in the driving control device 12, and is configured to detect a collision between the vehicle 1 and an object B. The built-in collision sensor 12*a* is a uniaxial acceleration sensor, also called a floor G sensor, and is configured to generate an output corresponding to the longitudinal acceleration acting on the vehicle 1. The longitudinal direction acceleration is also referred to as an acceleration in the traveling direction of the vehicle 1 or an acceleration in the X direction. Further, acceleration may also be referred to as deceleration when its direction is opposite to the traveling direction of the vehicle 1.

The vehicle 1 is equipped with a vehicle speed sensor 13, a steering angle sensor 14, a yaw rate sensor 15, and the like for detecting the driving state of the vehicle 1. The vehicle speed sensor 13, the steering angle sensor 14, the yaw rate sensor 15, and the like are connected to the driving control device 12 via an in-vehicle network conforming to a certain communication standard such as CAN. CAN is an international registered trademark and is an abbreviation for Controller Area Network.

The vehicle speed sensor 13 is provided to output a signal corresponding to the traveling speed of the vehicle 1. The steering angle sensor 14 is provided to output a signal corresponding to the steering angle of the vehicle 1. The yaw rate sensor 15 is provided to output a signal corresponding to the yaw rate acting on the vehicle 1.

Further, the vehicle 1 is provided with a satellite collision sensor 16 and an electromagnetic wave radar sensor 17. The satellite collision sensor 16 is a collision sensor provided separately from the driving control device 12, and is connected to the driving control device 12 via the above-mentioned in-vehicle safety system network. The satellite collision sensor 16 is configured to generate an output corresponding to the acceleration acting on the vehicle 1. Specifically, in the present embodiment, the satellite collision sensor 16 is a biaxial acceleration sensor capable of outputting a combined waveform of the longitudinal direction acceleration and the left-right direction acceleration. The left-right direction acceleration is also referred to as a lateral acceleration or an acceleration in the Y direction.

The electromagnetic wave radar sensor 17 is connected to the driving control device 12 via an in-vehicle network conforming to a certain communication standard such as CAN. The electromagnetic wave radar sensor 17 is placed at the front edge of the vehicle body 2. The electromagnetic wave radar sensor 17 is provided to detect the object B before it collides with the vehicle 1 by receiving a reflected wave of an electromagnetic wave from the object B ahead of the vehicle 1. The region ahead of the vehicle 1 mentioned here includes a first region R1. Further, the region ahead of the vehicle 1 includes a part of a second region R2 and a part of a third region R3. The first region R1 and other regions will be described later.

In the present embodiment, the electromagnetic wave radar sensor 17 has a configuration as a millimeter wave radar sensor which transmits and receives millimeter waves. That is, the electromagnetic wave radar sensor 17 is configured to acquire or calculate the object detection result by receiving the reflected wave of the transmitted millimeter wave from the object B. An object detection result is the detection result of the object B. Such detection result includes distance, direction, relative velocity, and collision probability.

A distance is the distance between the vehicle 1 and the object B. A direction is the direction of the object B from the vehicle 1. Specifically, the direction is the azimuth angle of the object B with respect to the vehicle center line L in a plan view. That is, for example, when the object B is located on the vehicle center line L, the direction of the object B is 0. Further, as shown in FIG. 1, when the object B is located on the left side of the vehicle center line L, the direction of the object B is $-\alpha$. $\alpha$ is a positive number. On the other hand, when the object B is located on right side of the vehicle center line L, the direction of the object B is $+\alpha$. The direction is also referred to as horizontal direction. A relative velocity is the relative velocity between the vehicle 1 and the object B.

Collision probability is a measure corresponding to the probability of collision between the vehicle 1 and the object B. In the present embodiment, the collision probability is, for example, the probability of the object B existing in a predetermined azimuth angle range whose center aligns with the directional axis of the electromagnetic wave radar sensor 17 in a plan view.

In the present embodiment, the vehicle 1 is equipped with a first millimeter wave radar sensor 17*a*, a second millimeter wave radar sensor 17*b*, and a third millimeter wave radar sensor 17*c* as electromagnetic wave radar sensors 17. The first millimeter wave radar sensor 17*a* is positioned on the vehicle center line L in plan view. The second millimeter wave radar sensor 17*b* is positioned on the right side of the vehicle center line L in plan view. The third millimeter wave radar sensor 17*c* is positioned on the left side of the vehicle center line L in plan view.

The first millimeter wave radar sensor 17*a* is provided so as to correspond to the first region R1. The first region R1 is a region ahead of the vehicle 1. That is, the first region R1 is a region ahead of the vehicle 1 within the azimuth angle range of $\pm\beta$ from the vehicle center line L. The first millimeter wave radar sensor 17*a* is also referred to as a front radar sensor.

The second millimeter wave radar sensor 17*b* is provided so as to correspond to the second region R2. The second region R2 is a region shifted in the vehicle width direction so that it is on one side, that is, on the right side of the first region R1. That is, the second region R2 is a right-front side region of the vehicle 1. The second millimeter wave radar sensor 17*b* is also referred to as a right-front side radar sensor.

The third millimeter wave radar sensor 17*c* is provided so as to correspond to the third region R3. The third region R3 is a region shifted in the vehicle width direction so that it is on the other side, that is, on the left side of the first region R1. That is, the third region R3 is a left-front side region of the vehicle 1. The third millimeter wave radar sensor 17*c* is also referred to as a left-front side radar sensor.

First Embodiment: Collision Form Estimation Using Object Detection Results

The functional configuration of the driving control device 12 according to the first embodiment will be described with reference to FIGS. 1 and 2.

In the present embodiment, the occupant protection system 10 is configured such that the driving control device 12 estimates the collision form that may occur with the object B based on the detection result of the object B provided by the electromagnetic wave radar sensor 17. The occupant protection system 10 is also configured such that the built-in collision sensor 12*a* and/or the satellite collision sensor 16 detect collision between the vehicle 1 and an object B. Further, the occupant protection system 10 is configured such that the driving control device 12 controls the driving of the occupant protection devices 11 based on the estimation result of the collision form when occurrence of a collision is detected. Therefore, at least the driving control device 12 and the electromagnetic wave radar sensor 17 constitute a control system 20 for controlling the operation of the occupant protection system 10. The control system 20 may also include a satellite collision sensor 16.

Figure 2:
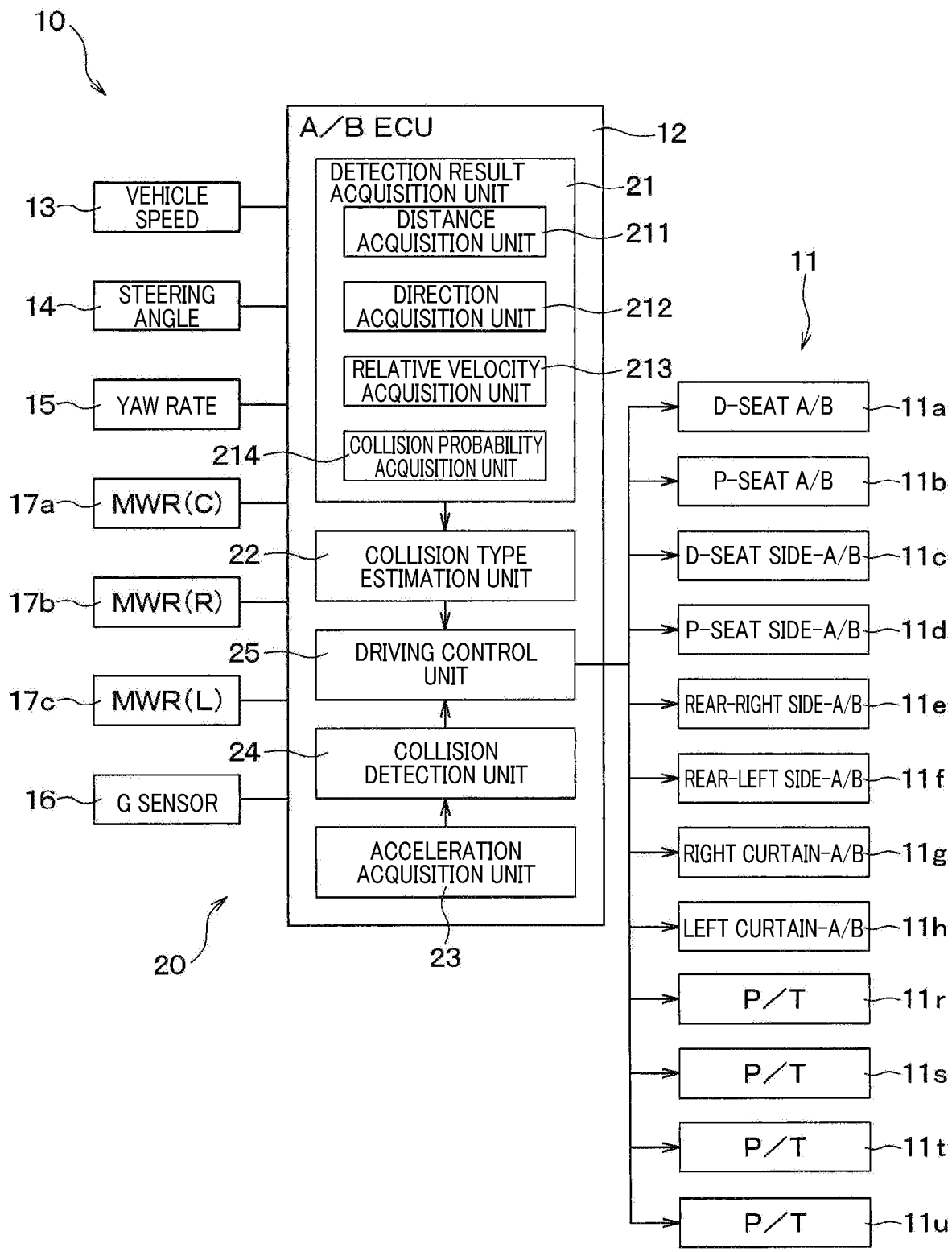
FIG. 2 is a block diagram showing the general functional configuration of a driving control device according to a first embodiment.

Specifically, referring to FIG. 2, the driving control device 12 includes, as a functional configuration realized by the microcomputer, a detection result acquisition unit 21, a collision form estimation unit 22, an acceleration acquisition unit 23, a collision detection unit 24, and a driving control device 25.

The detection result acquisition unit 21 acquires the detection result of the object B ahead of the vehicle 1 before collision. Specifically, in the present embodiment, the detection result acquisition unit 21 stores the object detection result acquired by the electromagnetic wave radar sensor 17 and received from the electromagnetic wave radar sensor 17 for a certain period of time. The detection result acquisition unit 21 may be configured as, for example, an area in the CPU built-in memory or an area on the RAM in the driving control device 12.

The detection result acquisition unit 21 includes a distance acquisition unit 211, a direction acquisition unit 212, a relative velocity acquisition unit 213, and a collision probability acquisition unit 214. The distance acquisition unit 211 is provided to acquire, that is, store the distance information. The direction acquisition unit 212 is provided to acquire, that is, store the direction information. The relative velocity acquisition unit 213 is provided to acquire, that is, store the relative velocity information. The collision probability acquisition unit 214 is provided to acquire, that is, store the collision probability information.

The collision form estimation unit 22 estimates the form of collision that may occur with the object B based on the object detection results corresponding to the object B. That is, the collision form estimation unit 22 estimates the collision form based on the distance, the direction, the relative velocity, and the collision probability acquired using the electromagnetic wave radar sensor 17. In the present embodiment, the collision form to be estimated includes a full frontal (head-on) collision, an offset frontal collision, and an oblique frontal collision.

A head-on collision is a frontal collision with an overlap ratio of substantially 100%. The overlap ratio is the ratio of the vehicle width to the length of the part of the vehicle body 2 colliding with the object B in the vehicle width direction. The vehicle width is the dimension of the vehicle body 2 in the vehicle width direction. A head-on collision may also be referred to as a full-lap frontal collision. An offset frontal collision is a frontal collision with an overlap ratio equal to or smaller than a predetermined value (for example, 75%). An offset frontal collision is hereinafter simply referred to as an offset collision. An oblique frontal collision is a frontal collision in which a corner part of the front surface 3 of the vehicle body 2 collides with an object B having a longitudinal direction or a lateral direction that is oblique with respect to the vehicle center line L in a plan view. An oblique frontal collision may also be referred to as an oblique collision. A typical example of an oblique frontal collision is a collision form with a relative angle of about 15° and an overlap ratio of about 35%, which are equivalent to the test conditions of the oblique collision test specified by NHTSA. NHTSA is an abbreviation for National Highway Traffic Safety Administration. An oblique frontal collision is hereinafter simply referred to as an oblique collision.

In the present embodiment, the collision form estimation unit 22 estimates the collision form based on the probability of collision with the object B in the first region R1, the second region R2, and the third region R3. That is, the collision form estimation unit 22 estimates the collision form based on the collision probability acquired using the first millimeter wave radar sensor 17a, the second millimeter wave radar sensor 17b, and the third millimeter wave radar sensor 17c. The details of the method of estimating the collision form will be described later.

The acceleration acquisition unit 23 acquires the acceleration acting on the vehicle 1, that is, the vehicle body 2 when the vehicle 1 collides with the object B. Specifically, in the present embodiment, the acceleration acquisition unit 23 acquires, that is, detects the acceleration based on the output of the built-in collision sensor 12a. Further, the acceleration acquisition unit 23 acquires an acceleration detection result by receiving the acceleration detection result obtained by the satellite collision sensor 16 from the satellite collision sensor 16.

The collision detection unit 24 detects occurrence of a collision between the vehicle 1 and an object B based on the acceleration acquired by the built-in collision sensor 12a and the satellite collision sensor 16. Specifically, in the present embodiment, the collision detection unit 24 determines that a collision has occurred when both of the following two conditions are satisfied.

Acceleration detection value GF from built-in collision sensor 12a>Threshold GFth Acceleration detection value GS from satellite collision sensor 16>Threshold GSth The driving control device 25 drives the occupant protection devices 11 when occurrence of a collision between the vehicle 1 and the object B has been detected using the built-in collision sensor 12a and the satellite collision sensor 16. In the present embodiment, the driving control device 25 as a device selection unit selects which of the plurality of occupant protection devices 11 should be driven based on the collision form estimated by the collision form estimation unit 22. Further, the driving control device 25 drives one or more selected occupant protection devices 11 when the collision detection unit 24 determines that a collision has occurred.

[Outline of Operation]

Next, the outline of the operation of the configuration according to the present embodiment will be described together with the effects provided by the configuration.

The electromagnetic wave radar sensor 17 detects an object B ahead of the vehicle 1 before collision. Specifically, the first millimeter wave radar sensor 17a as the electromagnetic wave radar sensor 17 corresponding to the first region R1 detects an object B in the first region R1. The second millimeter wave radar sensor 17b as the electromagnetic wave radar sensor 17 corresponding to the second region R2 detects an object B in the second region R2. The third millimeter wave radar sensor 17c as the electromagnetic wave radar sensor 17 corresponding to the third region R3 detects an object B in the third region R3.

The object detection results from the electromagnetic wave radar sensor 17 include the distance between the vehicle 1 and the object B, the direction of the object B from the vehicle 1, the relative velocity between the vehicle 1 and the object B, and the probability of collision between the vehicle 1 and the object B. Specifically, the object detection results from the first millimeter wave radar sensor 17a include information on the distance, direction, relative velocity, and collision probability in the first region R1. The object detection results from the second millimeter wave radar sensor 17*b* include information on the distance, direction, relative velocity, and collision probability in the second region R2. The object detection results from the third millimeter wave radar sensor 17*c* include information on the distance, direction, relative velocity, and collision probability in the third region R3.

The driving control device 12 receives the object detection results obtained by the electromagnetic wave radar sensor 17 from the electromagnetic wave radar sensor 17. The detection result acquisition unit 21 thus acquires the detection results corresponding to the object B ahead of the vehicle 1 before collision.

The collision form estimation unit 22 estimates the form of collision that may occur with the object B based on the object detection results acquired by the detection result acquisition unit 21. In the present embodiment, the collision form estimation unit 22 estimates the collision form based on the probability of collision with the object B in the first region R1, the second region R2, and the third region R3. Specifically, the collision form estimation unit 22 estimates the collision form based on the collision probability acquired using the first millimeter wave radar sensor 17*a*, the second millimeter wave radar sensor 17*b*, and the third millimeter wave radar sensor 17*c*.

The acceleration acquisition unit 23 acquires the acceleration acting on the vehicle 1, that is, the vehicle body 2 when the vehicle 1 collides with the object B. The collision detection unit 24 detects occurrence of a collision between the vehicle 1 and an object B based on the acceleration acquired by the acceleration acquisition unit 23. Specifically, the collision detection unit 24 detects occurrence of a collision based on the waveform of the acceleration in the X direction at the built-in collision sensor 12*a*, which is a uniaxial sensor. Further, the collision detection unit 24 detects occurrence of a collision based on a combined waveform between the X-direction acceleration and the Y-direction acceleration at the satellite collision sensor 16, which is a biaxial sensor. When both the result of the collision occurrence detection by the built-in collision sensor 12*a* and the result of the collision occurrence detection by the satellite collision sensor 16 are affirmative, the collision detection unit 24 outputs a collision affirmative signal to drive the occupant protection device(s) 11.

The driving control device 25 selects which of the occupant protection devices 11 should be driven when a collision occurs based on the collision form estimated by the collision form estimation unit 22. Further, the driving control device 25 drives one or more selected occupant protection devices 11 when it is determined that a collision has occurred, in other words, when a collision is detected and the collision detection unit 24 outputs a collision affirmative signal.

As described earlier, according to the present embodiment, the collision form estimation unit 22 estimates the form of collision that may occur with an object B based on the detection results corresponding to the object B ahead of the vehicle 1 before collision. The driving control device 25 form estimation selects which of the occupant protection devices 11 should be driven when a collision is detected based on the collision form estimated by the collision form estimation unit 22. Therefore, it is possible to control the driving of the occupant protection devices 11 more preferably. Further, it is possible to obtain a good estimate of the collision form without increasing the number of satellite collision sensors 16.

In addition, the collision form estimation unit 22 estimates the collision form based on the distance, direction, relative velocity, and collision probability acquired as object detection results. Specifically, the collision form estimation unit 22 estimates the collision form based on the collision probability in the first region R1, the second region R2, and the third region R3. The first region R1 is a region ahead of the vehicle 1. The second region R2 is a region shifted in the vehicle width direction so that it is on one side of the first region R1. The third region R3 is a region shifted in the vehicle width direction so that it is on the other side of the first region R1. Therefore, the collision form can be estimated with good accuracy.

The collision form estimation unit 22 estimates the collision form based on the collision probability acquired using the electromagnetic wave radar sensor 17. Specifically, the collision form estimation unit 22 estimates the collision form based on the collision probability acquired using the first millimeter wave radar sensor 17*a*, the second millimeter wave radar sensor 17*b*, and the third millimeter wave radar sensor 17*c*. The first millimeter wave radar sensor 17*a* is an electromagnetic wave radar sensor 17 corresponding to the first region R1. The second millimeter wave radar sensor 17*b* is an electromagnetic wave radar sensor 17 corresponding to the second region R2. The third millimeter wave radar sensor 17*c* is an electromagnetic wave radar sensor 17 corresponding to the third region R3.

The electromagnetic wave radar sensors 17, that is, the first millimeter wave radar sensor 17*a*, the second millimeter wave radar sensor 17*b*, and the third millimeter wave radar sensor 17*c* may be planned to be installed in the vehicle 1 from the beginning for the purpose of automated driving or the like. In this respect, according to the present embodiment, it is possible to determine the collision form for protection of occupants upon collision by effectively utilizing equipment planned to be installed for a purpose other than protection of occupants upon collision.

Operation Example

A specific example of the operation of the driving control device 12 according to this embodiment will be described with reference to the flowcharts shown in FIGS. 3 and 4. In the figures, the steps are denoted by S.

Figure 3:
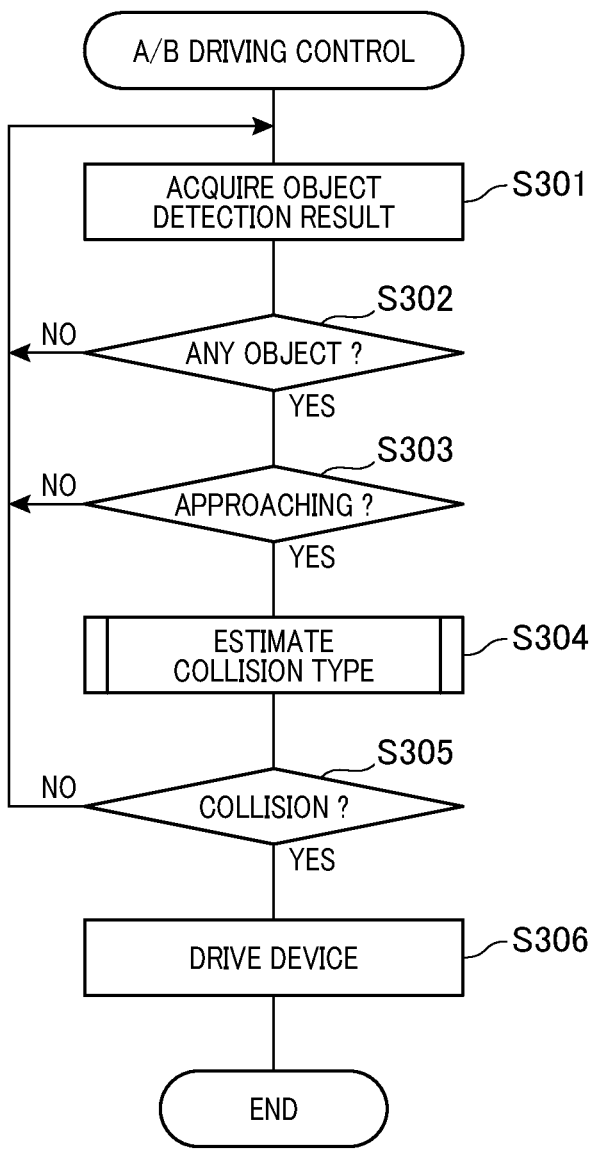
FIG. 3 is a flowchart for explaining an example of the operation of the driving control device shown in FIG. 2.

FIG. 3 shows an outline of the processing in the occupant protection device driving control performed by the driving control device 12. First, in step 301, the driving control device 12 receives the object detection results from the electromagnetic wave radar sensors 17. That is, the detection result acquisition unit 21 acquires the object detection results.

Next, in step 302, the driving control device 12 determines whether there is an object B ahead of the vehicle 1 that may collide with it. That is, the driving control device 12 determines whether the probability of presence of an object B that may collide with the vehicle has reached a predetermined level in at least one of the first region R1, the second region R2, and the third region R3.

Specifically, the driving control device 12 determines whether any one of PC>PCth1, PR>PRth1, and PL>PLth1 is satisfied. PC is the presence probability in the first region R1. PR is the presence probability in the second region R2. PL is the presence probability in the third region R3. PCth1, PRth1, and PLth1 are reference values for determining the presence or absence of an object B that may collide with the vehicle in step 302.

When there is no object B ahead of the vehicle 1 that may collide with it (that is, step 302=NO), the process returns to step 301. On the other hand, when there is an object B ahead of the vehicle 1 that may collide with it (that is, step 302=YES), the process proceeds to step 303.

In step 303, the driving control device 12 determines whether the object B that has been confirmed in step 302 is approaching the vehicle 1 to a predetermined degree. The determination in step 302 can be considered as detecting the probability of collision.

Specifically, the driving control device 12 determines whether any one of TC<TCth1, TR<TRth1, and TL<TLth1 is satisfied. TC is calculated by the equation TC=DC/VC using the distance DC and the relative velocity VC acquired by the first millimeter wave radar sensor 17a. TR is calculated by the equation TR=DR/VR using the distance DR and the relative velocity VR acquired by the second millimeter wave radar sensor 17b. TL is calculated by the equation TL=DL/VL using the distance DL and the relative velocity VL acquired by the third millimeter wave radar sensor 17c. TC, TR, and TL are similar to or equivalent to the so-called time-to-collision. Time-to-collision is also referred to as TTC, which is an abbreviation for Time-To-Collision. TCth1, TRth1, and TLth1 are reference values for detecting the probability of collision in step 303.

When it is determined that there is no probability of collision (that is, step 303=NO), the process returns to step 301. On the other hand, when it is determined that there is a probability of collision (that is, step 303=YES), the process proceeds to step 304.

In step 304, the driving control device 12, that is, the collision form estimation unit 22 estimates the collision form. The details of the operation of estimating the collision form will be described later.

In step 305, the driving control device 12, that is, the collision detection unit 24 determines whether a collision has occurred. When it is determined that a collision has not occurred (that is, step 305=NO), the process returns to step 301. On the other hand, when it is determined that a collision has occurred (that is, step 305=YES), the process proceeds to step 306. In step 306, the driving control device 12, that is, the driving control device 25 selectively drives the occupant protection device(s) 11 corresponding to the collision form estimated in step 304.

Figure 4:
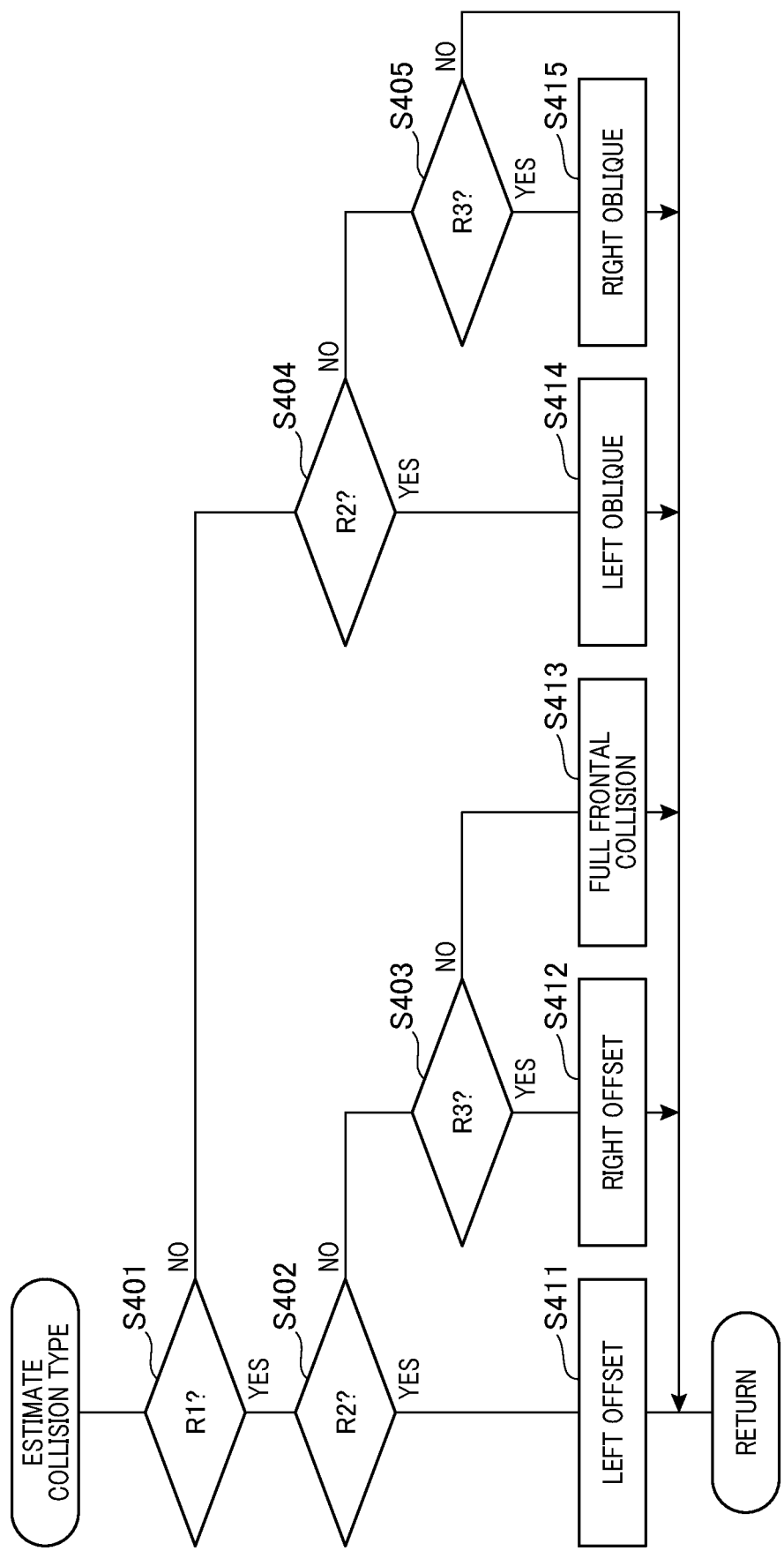
FIG. 4 is a flowchart for explaining an example of the operation of the driving control device shown in FIG. 2.

FIG. 4 shows an example of the collision form estimation operation. First, in step 401, the collision form estimation unit 22 determines whether there is a probability of collision in the first region R1. Specifically, the collision form estimation unit 22 determines whether PR>PCth2 and TC<TCth2 are satisfied, where PCth2≥PCth1 and TCth2≤TCth1.

When there is a probability of collision in the first region R1 (that is, step 401=YES), the process proceeds to step 402. In step 402, the collision form estimation unit 22 determines whether there is a probability of collision in the second region R2. Specifically, the collision form estimation unit 22 determines whether PR>PRth2 and TR<TRth2 are satisfied, where PRth2≥PRth1 and TRth2≤TRth1.

When there is no probability of collision in the second region R2 (that is, step 402=NO), the process proceeds to step 403. In step 403, the collision form estimation unit 22 determines whether there is a probability of collision in the third region R3. Specifically, the collision form estimation unit 22 determines whether PL>PLth2 and TL<TLth2 are satisfied, where PLth2≥PLth1 and TLth2≤TLth1.

When there is no probability of collision in the first region R1 (that is, step 401=NO), the process proceeds to step 404. In step 404, the collision form estimation unit 22 determines whether there is a probability of collision in the second region R2. The determination in step 404 is generally the same as the determination in step 402.

When there is no probability of collision in the second region R2 (that is, step 404=NO), the process proceeds to step 405. In step 405, the collision form estimation unit 22 determines whether there is a probability of collision in the third region R3. The determination in step 405 is generally the same as the determination in step 403.

The collision form is estimated as follows according to the determination results obtained in steps 401 to 405.

Specifically, for example, there may be a probability of collision in the first region R1 (that is, step 401=YES) and a probability of collision in the second region R2 (that is, step 402=YES). In this case, the process proceeds to step 411. In step 411, the collision form estimation unit 22 estimates the collision form as left offset collision. A left offset collision is an offset collision in which the object B which is expected to collide is displaced to the left relative to the vehicle 1 as compared with the case of a head-on collision.

In another scenario, there may be a probability of collision in the first region R1 (that is, step 401=YES), no probability of collision in the second region R2 (that is, step 402=NO), and a probability of collision in the third region R3 (that is, step 403=YES). In this case, the process proceeds to step 412. In step 412, the collision form estimation unit 22 estimates the collision form as right offset collision. A right offset collision is an offset collision in which the object B which is expected to collide is displaced to the right relative to the vehicle 1 as compared with the case of a head-on collision.

In another scenario, there may be a probability of collision in the first region R1 (that is, step 401=YES), no probability of collision in the second region R2 (that is, step 402=NO), and no probability of collision in the third region R3 (that is, step 403=NO). In this case, the process proceeds to step 413. In step 413, the collision form estimation unit 22 estimates the collision form as head-on collision.

In still another case, there may be no probability of collision in the first region R1 (that is, step 401=NO) and a probability of collision in the second region R2 (that is, step 404=YES). In this case, the process proceeds to step 414. In step 414, the collision form estimation unit 22 estimates the collision form to be left oblique collision. A left oblique collision is an oblique collision in which the object B which is expected to collide is displaced to the left relative to the vehicle 1 as compared with the case of a head-on collision.

In yet another scenario, there may be no probability of collision in the first region R1 (that is, step 401=NO), no probability of collision in the second region R2 (that is, step 404=NO), and a probability of collision in the third region R3 (that is, step 405=YES). In this case, the process proceeds to step 415. In step 415, the collision form estimation unit 22 estimates the collision form to be right oblique collision. A right oblique collision is an oblique collision in which the object B which is expected to collide is displaced to the right relative to the vehicle 1 as compared with the case of a head-on collision.

Second Embodiment: Collision Detection Using Object Detection Results

The functional configuration of the driving control device 12 according to the second embodiment will be described with reference to FIG. 5. Note that, in the following description of the second embodiment, parts different from the first embodiment will be mainly described. The same or equivalent parts of the first and second embodiments are assigned the same reference signs. Therefore, in the following description of the second embodiment, regarding the components having the same reference signs as those of the first embodiment, the description given in connection with the first embodiment can be applied as appropriate unless there is technical contradiction or particular additional mention.

In the first embodiment, the object detection results corresponding to an object B ahead of the vehicle 1 before collision was used to estimate the collision form. On the other hand, in the second embodiment, the object detection results are used for collision detection. That is, the object detection results can be used for collision form estimation and/or collision detection.

Figure 5:
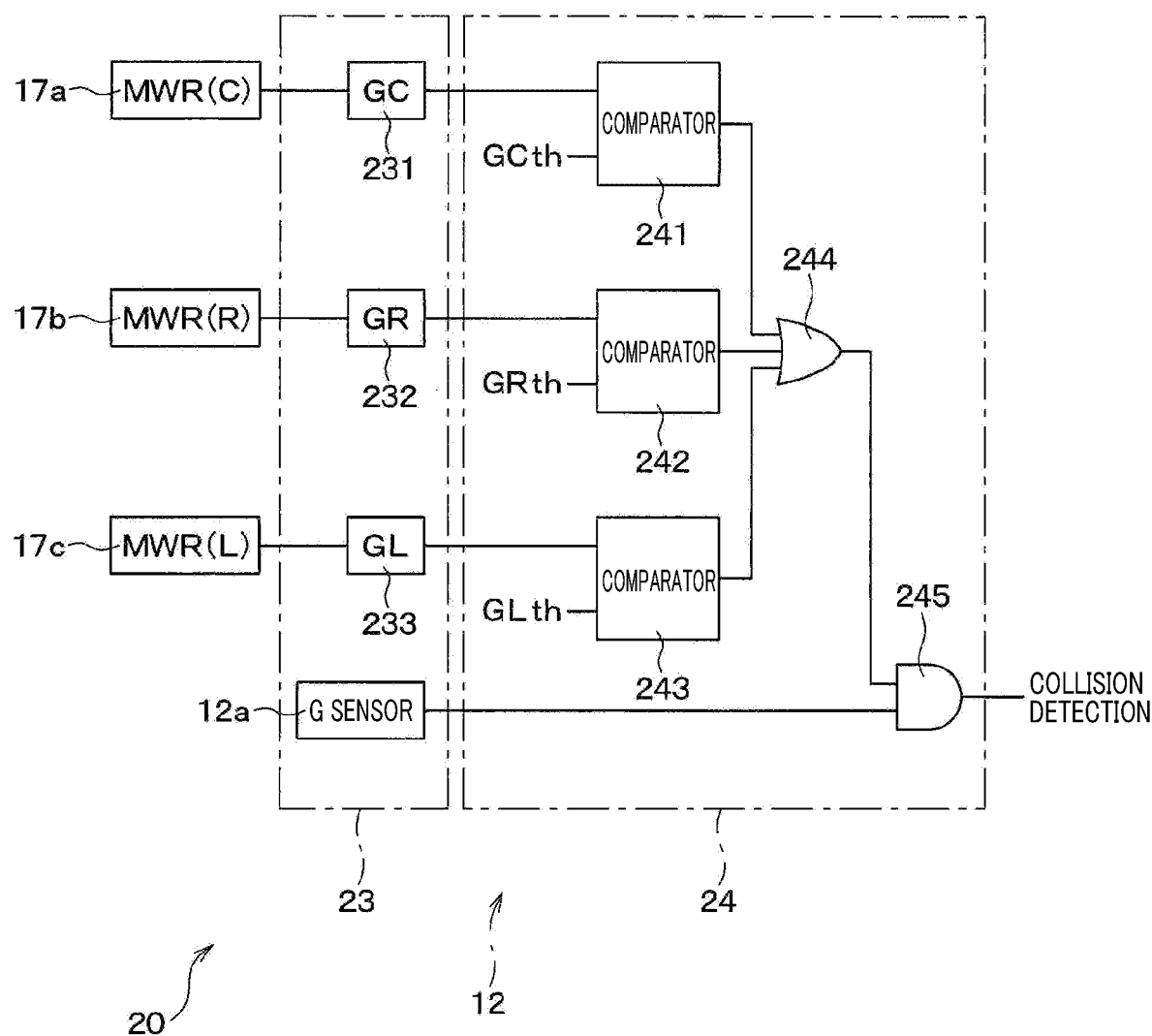
FIG. 5 is a block diagram showing the general functional configuration of a driving control device according to a second embodiment.

FIG. 5 is a diagram showing a part of the functional configuration of the driving control device 12 according to the present embodiment. In this embodiment, the acceleration acquisition unit 23 calculates an estimate of the acceleration acting on the vehicle 1 when the vehicle 1 collides with the object B based on the object detection results. The driving control device 12 is configured to drive the occupant protection devices 11 when the estimated value calculated by the acceleration acquisition unit 23 exceeds a collision detecting threshold.

The acceleration acquisition unit 23 calculates the estimated value based on the object detection results acquired using the electromagnetic wave radar sensors 17. Specifically, as shown in FIG. 5, the acceleration acquisition unit 23 includes a first estimate acquisition unit 231, a second estimate acquisition unit 232, and a third estimate acquisition unit 233 in addition to the built-in collision sensor 12a.

The first estimate acquisition unit 231 calculates a first acceleration estimate GC based on the object detection results obtained using the first millimeter wave radar sensor 17a. The first acceleration estimate GC is an estimated value of the acceleration acting on the vehicle 1 when a collision occurs, which is calculated using the acquired values of the distance, direction, relative velocity, and collision probability provided by the first millimeter wave radar sensor 17a.

The second estimate acquisition unit 232 calculates a second acceleration estimate GR based on the object detection results obtained using the second millimeter wave radar sensor 17b. The second acceleration estimate GR is an estimated value of the acceleration acting on the vehicle 1 when a collision occurs, which is calculated using the acquired values of the distance, direction, relative velocity, and collision probability provided by the second millimeter wave radar sensor 17b.

The third estimate acquisition unit 233 calculates a third acceleration estimate GL based on the object detection results obtained using the third millimeter wave radar sensor 17c. The third acceleration estimate GL is an estimated value of the acceleration acting on the vehicle 1 when a collision occurs, which is calculated using the acquired values of the distance, direction, relative velocity, and collision probability provided by the third millimeter wave radar sensor 17c.

Further, in the present embodiment, the collision detection unit 24 includes a first comparison unit 241, a second comparison unit 242, a third comparison unit 243, a comparison result generation unit 244, and a detection result generation unit 245. The first comparison unit 241 determines whether the first acceleration estimate GC exceeds a first collision detecting threshold GCth. The second comparison unit 242 determines whether the second acceleration estimate GR exceeds a second collision detecting threshold GRth. The third comparison unit 243 determines whether the third acceleration estimate GL exceeds a third collision detecting threshold GLth.

The comparison result generation unit 244 determines whether the estimated acceleration value exceeds the corresponding collision detecting threshold at any of the first to third comparison units 241 to 243. Specifically, the comparison result generation unit 244 is a 3-input OR gate configured to output an affirmative signal 1 when a predetermined condition is satisfied and output a negative signal 0 when the condition is not satisfied. In this example, the predetermined condition is that at least one of the first to third comparison units 241 to 243 generates an output that would be output when the estimated acceleration value exceeds the collision detecting threshold.

The detection result generation unit 245 determines whether a collision has been detected by the built-in collision sensor 12a and the electromagnetic wave radar sensors 17. That is, when the built-in collision sensor 12a affirms occurrence of a collision and also the comparison result generation unit 244 outputs an affirmative signal, the detection result generation unit 245 outputs a collision affirmative signal to drive the occupant protection device(s) 11.

New values of the object detection results corresponding to the object B ahead of the vehicle 1 before collision, specifically, the distance, direction, relative velocity, and probability of collision are acquired at certain intervals (for example, 200 ms). Therefore, by using the time lapse of the object detection results and the time lapse of the driving state of the vehicle 1, it is possible to calculate an estimate of the acceleration acting on the vehicle 1 when a collision between the vehicle 1 and the object B occurs, with good accuracy.

In view of this, in this embodiment, the acceleration acquisition unit 23 calculates an estimate of the acceleration acting on the vehicle 1 when the vehicle 1 collides with the object B based on the object detection results acquired using the electromagnetic wave radar sensors 17. This makes it possible to omit the satellite collision sensor 16 shown in FIGS. 1 and 2. That is, instead of or in addition to the collision detection using the satellite collision sensor 16, collision detection based on the object detection results can be used.

Third Embodiment: Collision Detection Using Disconnection Signal

Figure 6:
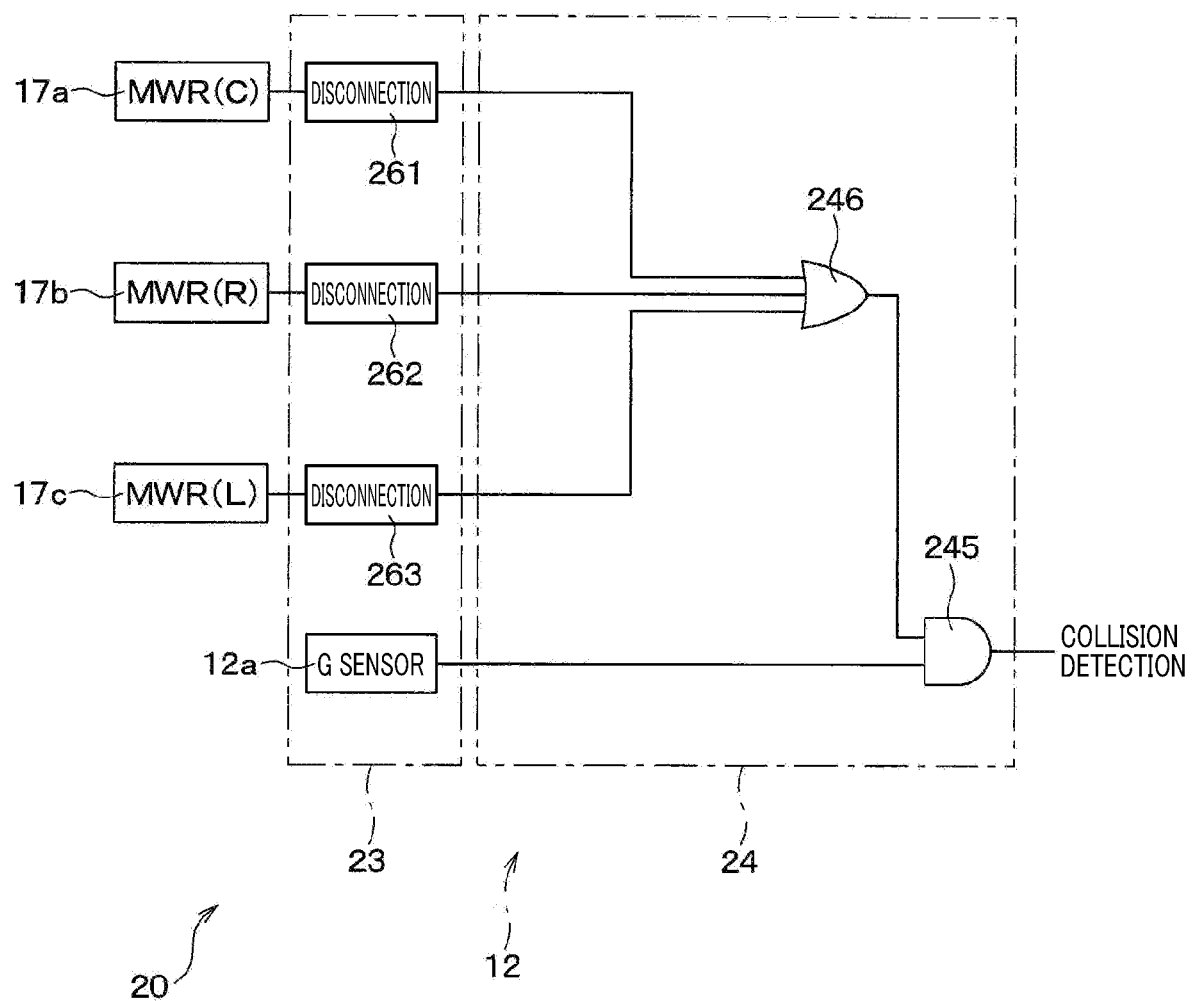
FIG. 6 is a block diagram showing the general functional configuration of a driving control device according to a third embodiment.

The functional configuration of the driving control device 12 according to the third embodiment will be described with reference to FIG. 6. In the following description of the third embodiment, the parts different from the first and second embodiments will be mainly described. Further, in the following description of the third embodiment, regarding the components having the same reference signs as those of the first or second embodiment, the description given in connection with the first or second embodiment can be applied as appropriate unless there is technical contradiction or particular additional mention.

When a frontal collision occurs between the vehicle 1 and the object B, the impact of the collision also acts on the electromagnetic wave radar sensor(s) 17 provided at the front edge of the vehicle body 2. When the impact is light, the electromagnetic wave radar sensor 17 may become misaligned. When the impact is more severe, the impact may cause a disconnection in the electromagnetic wave radar sensor 17.

When a disconnection occurs in the electromagnetic wave radar sensor 17, it can be assumed that a frontal collision that requires activation of the occupant protection devices 11 has occurred. Further, occurrence of disconnection in the electromagnetic wave radar sensor 17 can be detected outside the electromagnetic wave radar sensor 17, for example, by the driving control device 12. Therefore, the detection result of disconnection in the electromagnetic wave radar sensor 17 can be used to detect a frontal collision that requires activation of the occupant protection devices 11 and also to detect the impact, that is, the acceleration associated with the collision.

Therefore, in the present embodiment, the driving control device 12 is configured to drive the occupant protection device(s) 11 when a disconnection failure of the electromagnetic wave radar sensor 17 due to an impact acting on the electromagnetic wave radar sensor 17 upon collision is detected.

Specifically, the collision detection unit 24 includes a detection result generation unit 245 and a disconnection signal detection unit 246. The acceleration acquisition unit 23 includes a first disconnection detection unit 261, a second disconnection detection unit 262, and a third disconnection detection unit 263 in addition to the built-in collision sensor 12a. That is, in the present embodiment, as shown in FIG. 6, the disconnection signal detection unit 246 is provided instead of the comparison result generation unit 244 shown in FIG. 5. Further, instead of the first to third estimate acquisition units 231 to 233 shown in FIG. 5, the first to third disconnection detection unit 261 to 263 are provided.

When the built-in collision sensor 12a detects occurrence of a collision and also the disconnection signal detection unit 246 detects a disconnection signal, the detection result generation unit 245 outputs a collision affirmative signal to drive the occupant protection device(s) 11. The disconnection signal detection unit 246 determines whether a disconnection signal corresponding to any one of the first to third millimeter wave radar sensors 17a to 17c has been detected. Specifically, the disconnection signal detection unit 246 is a 3-input OR gate configured to generate an output corresponding to the output results of the first to third disconnection detection unit 261 to 263.

The first disconnection detection unit 261 detects a disconnection failure in the first millimeter wave radar sensor 17a. That is, the first disconnection detection unit 261 outputs an affirmative signal 1 when it detects a disconnection signal corresponding to a disconnection in the first millimeter wave radar sensor 17a, and outputs a negative signal 0 when it does not detect the disconnection signal.

The second disconnection detection unit 262 detects a disconnection failure in the second millimeter wave radar sensor 17b. That is, the second disconnection detection unit 262 outputs an affirmative signal 1 when it detects a disconnection signal corresponding to a disconnection in the second millimeter wave radar sensor 17b, and outputs a negative signal 0 when it does not detect the disconnection signal.

The third disconnection detection unit 263 detects a disconnection failure in the third millimeter wave radar sensor 17c. That is, the third disconnection detection unit 263 outputs an affirmative signal 1 when it detects a disconnection signal corresponding to a disconnection in the third millimeter wave radar sensor 17c, and outputs a negative signal 0 when it does not detect the disconnection signal.

In such a configuration, the acceleration acquisition unit 23 detects a collision between the vehicle 1 and an object B based on the detection results of the disconnection signals. This makes it possible to omit the satellite collision sensor 16 shown in FIGS. 1 and 2. That is, instead of or in addition to the collision detection using the satellite collision sensor 16, collision detection based on the disconnection signals can be used.

Note that this embodiment can be combined with the above-described first embodiment. That is, in such a configuration, when a collision is detected, the driving control device 25 selects which of the occupant protection devices 11 should be driven based on the collision form estimated by the collision form estimation unit 22. Further, the driving control device 25 drives the selected occupant protection device 11 when a disconnection failure of an electromagnetic wave radar sensor 17 due to the impact acting on the electromagnetic wave radar sensor 17 upon collision is detected. This makes it possible to preferably realize the driving of appropriate occupant protection devices 11 in accordance with the collision form by a system configuration that is simplified as much as possible.

Fourth Embodiment

The functional configuration of the driving control device 12 according to the third embodiment will be described with reference to FIG. 7. This embodiment corresponds to a combination of the second and third embodiments.

Figure 7:
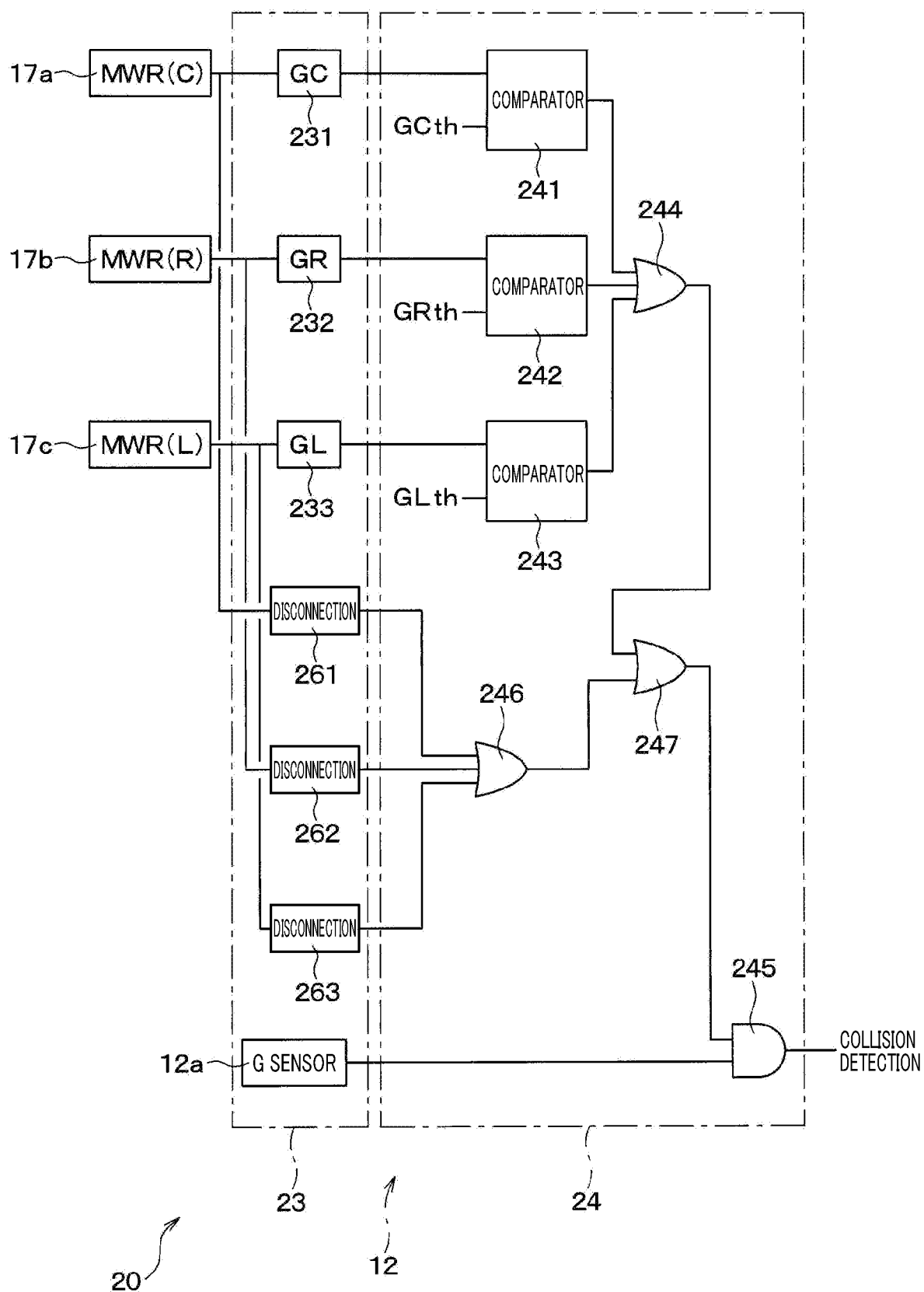
FIG. 7 is a block diagram showing the general functional configuration of a driving control device according to a fourth embodiment.

That is, as shown in FIG. 7, the acceleration acquisition unit 23 includes a first estimate acquisition unit 231, a second estimate acquisition unit 232, and a third estimate acquisition unit 233. The acceleration acquisition unit 23 includes a first disconnection detection unit 261, a second disconnection detection unit 262, and a third disconnection detection unit 263.

The collision detection unit 24 includes a first comparison unit 241, a second comparison unit 242, a third comparison unit 243, a comparison result generation unit 244, and a detection result generation unit 245. The collision detection unit 24 also includes a disconnection signal detection unit 246.

The collision detection unit 24 further includes a safing detection unit 247. The safing detection unit 247 outputs a safing signal when either the comparison result generation unit 244 outputs an affirmative signal or the disconnection signal detection unit 246 detects a disconnection signal. When the built-in collision sensor 12a affirms occurrence of a collision and the safing detection unit 247 outputs a safing signal, the detection result generation unit 245 outputs a collision affirmative signal to drive the occupant protection device(s) 11.

[Modifications]

The present disclosure is not limited to the above embodiments. Therefore, the above embodiments can be modified as appropriate. Typical modified examples will be described below. In the following description of the modified examples, the parts different from the above embodiments will be mainly described. Further, the same or equivalent parts of the above-described embodiments and the modified examples are designated by the same reference symbols. Therefore, in the following description of the modified examples, regarding the components having the same reference signs as those of the above embodiments, the description given in connection with the above embodiments can be applied as appropriate unless there is technical contradiction or particular additional mention.

The present disclosure is not limited to the specific device configuration described with regard to the above embodiment. For example, the geometry of the reinforcing member 5 and the geometry of the side members 6 is not limited to the above specific examples. That is, for example, each of the pair of side members 6 may be oblique with respect to the overall length direction of the vehicle such that the distance between the side members 6 in the vehicle width direction increases as it gets closer to their front ends. In this case, the reinforcing member 5 may have a curved shape similar to that of the above specific example. Alternatively, the reinforcing member 5 may have a straight rod shape substantially parallel to the vehicle width direction in front view and plan view.

The communication standard applied to the occupant protection system 10 is not limited to the above-described DSI3 and CAN. For example, communication standards such as Safe-by-Wire and PSI5 may be used. PSI5 is an abbreviation for Peripheral Sensor Interface 5.

Similarly, the type, number, configuration, and arrangement of the occupant protection devices 11 are not particularly limited. For example, a driver's seat knee airbag and a passenger's seat knee airbag may be provided as occupant protection devices 11. The driver's seat knee airbag is provided to be deployed in front of the knee of the occupant seated in the driver's seat. The passenger's seat knee airbag is provided to be deployed in front of the knee of the occupant seated in the passenger's seat.

The driving control device 12 may be implemented by hardware, for example, by an ASIC or the like. ASIC is an abbreviation for Application Specific Integrated Circuit.

The built-in collision sensor 12a may be a biaxial acceleration sensor.

In the first embodiment, the collision detection unit 24 detects occurrence of a collision between the vehicle 1 and an object B based on the acceleration acquired by the built-in collision sensor 12a and the satellite collision sensor 16. However, the present disclosure is not limited to such mode. That is, for example, the collision detection unit 24 may detect occurrence of a collision between the vehicle 1 and an object B based on the acceleration acquired by the built-in collision sensor 12a or the satellite collision sensor 16.

It has been described above that the first embodiment makes it possible to obtain a good estimate of the collision form without increasing the number of satellite collision sensors 16. However, the present disclosure is not limited to this. That is, for example, conventionally-proposed collision form estimation carried out using a plurality of acceleration sensors may be used in combination with the collision form estimation according to the present disclosure carried out using the object detection results.

Specifically, for example, a satellite collision sensor 16 may be provided at each of the right and left side-members 6. Further, the satellite collision sensor 16 may be provided in the middle part in the vehicle overall length direction, for example, at or near a position corresponding to the B pillar (not shown). Further, the satellite collision sensor 16 may be provided in the rear part in the vehicle overall length direction, for example, at or near a position corresponding to the C-pillar (not shown).

It has been described above that the second embodiment makes it possible to omit the satellite collision sensor 16. However, the present disclosure is not limited to this. For example, as described earlier, the collision detection using the satellite collision sensor 16 may be combined with the collision detection based on the object detection results. Further, the collision detection based on the object detection results allows the built-in collision sensor 12a to be omitted. In other words, the present invention can be implemented by at least one of the built-in collision sensor 12a, the satellite collision sensor 16, and the collision detection based on the object detection results.

It has been described above that the third embodiment also makes it possible to omit the satellite collision sensor 16. However, the present disclosure is not limited to this.

In the above-described embodiments, a first millimeter wave radar sensor 17a, a second millimeter wave radar sensor 17b, and a third millimeter wave radar sensor 17c were used as the electromagnetic wave radar sensors 17. However, the present disclosure is not limited to such mode. That is, the number and arrangement of millimeter wave radar sensors are not particularly limited.

An electromagnetic wave radar sensor 17 is not limited to a millimeter wave radar sensor. That is, for example, a submillimeter wave radar sensor or a laser radar sensor may be used. A laser radar sensor is also called a LIDAR sensor. LIDAR is an abbreviation for Light Detection and Ranging.

The sensor for acquiring the object detection results for collision form estimation or collision detection is not limited to the electromagnetic wave radar sensor 17. That is, for example, an image sensor may be used instead of or in addition to the electromagnetic wave radar sensor 17. The image sensor is a digital camera device that includes a solid-state imaging element such as a CMOS sensor or a CCD sensor. CMOS is an abbreviation for Complementary MOS. CCD is an abbreviation for Charge Coupled Device. When an image sensor is used, for example, a well-known image analysis method such as SFM can be used. SFM is an abbreviation for Structure from Motion.

The present disclosure is not limited to the specific examples of operations described with regard to the above embodiments. For example, the collision probability may be calculated by the driving control device 12.

Collision probability may be the probability of an object B existing in an expected traveling area of the vehicle 1. An expected traveling area is, for example, a strip-shaped area whose center line extends along the expected traveling path and having a width corresponding to the vehicle width of the vehicle 1 about the planned travel track in a plan view. An expected traveling path is the path the center point of the vehicle 1 is expected to take at the present time, i.e., at the time the path is calculated. The path is calculated based on information such as the driving state of the vehicle 1.

Collision probability is not limited to a presence probability. For example, the collision probability may be TTC. That is, the object detection results may be distance, direction, relative velocity, and TTC.

TC, TR, and TL may be calculated by the electromagnetic wave radar sensors 17 or by the driving control device 12.

PCth2 may be equal to PCth1 (PCth2=PCth1). In this case, in step 401, whether both PC>PCth1 and TC<TCth2 are satisfied may be determined. The same applies to steps 402 to 405.

TCth2 may be equal to TCth1 (TCth2=TCth1). In this case, in step 401, whether both PC>PCth2 and TC<TCth1 are satisfied may be determined. The same applies to steps 402 to 405.

PCth2 may be equal to PCth1 and TCth2 may be equal to TCth1 (PCth2=PCth1 and TCth2=TCth1). In this case, in step 401, whether both PC>PCth1 and TC<TCth1 are satisfied may be determined. The same applies to steps 402 to 405.

In step 401 of FIG. 4, whether TC<TCth2 is satisfied may be determined. The same applies to steps 402 to 405.

The expression there is a probability of collision in steps 401 to 405 can be rephrased as the probability of collision has reached a predetermined level or higher or the probability of collision is high. Similarly, the expression there is no probability of collision can be rephrased as the probability of collision has not reached a predetermined level or the probability of collision is low.

The inequality signs in the detecting steps may have an equal sign or not. That is, equal to or greater than a threshold and exceeds a threshold may be interchangeable. Likewise, smaller than a threshold and equal to or smaller than a threshold may be interchangeable.

The expression acquire can be replaced with other terms such as estimate, detect, calculate, generate, and receive depending on the context, that is, to the extent that there is no technical contradiction.

It goes without saying that the components of the above-described embodiments are not necessarily essential unless expressly stated otherwise or it is considered to be obviously essential in principle, etc. In addition, when a numerical value such as the number, value, amount, or range of a component(s) is mentioned, the present disclosure is not limited to the particular number unless expressly stated otherwise or it is obviously limited to the particular number in principle, etc. Similarly, when the shape, direction, positional relationship, or the like of a component or the like is mentioned, the present disclosure is not limited to the shape, direction, positional relationship, or the like unless explicitly stated otherwise or it is limited to the specific shape, direction, positional relationship, or the like in principle, etc.

Modified examples are also not limited to the above examples. A plurality of modified examples can be combined with each other. Further, all or a part of one or more of the above-described embodiments may be combined with all or a part of one or more of the modified examples.

Each of the above-described functional configurations and methods may be realized by a dedicated computer provided by configuring a processor and a memory programmed to execute one or more functions embodied by computer programs. Alternatively, each of the functional configurations and methods described above may be realized by a dedicated computer provided by configuring a processor with one or more dedicated hardware logic circuits. Alternatively, each of the functional configurations and methods described above may be realized by one or more dedicated computers configured by combining a processor and a memory programmed to execute one or more functions with a processor configured by one or more hardware logic circuits. Further, the computer program may be stored in a computer-readable non-transitional tangible recording medium as instructions executed by the computer.

CONCLUSION

The present disclosure presented by way of the above-described embodiments and modifications includes the following aspects. Note that the following aspects can be applied in combination with each other as long as there is no technical contradiction.

According to the first aspect, a driving control device configured to control driving of occupant protection devices to be mounted on a vehicle include a detection result acquisition unit, a collision form estimation unit, and a device selection unit. The detection result acquisition unit acquires a detection result of an object ahead of the vehicle before collision. The collision form estimation unit estimates a form of collision that may occur with the object based on the detection result. When a collision between the vehicle and the object is detected, the device selection unit selects which of the occupant protection devices should be driven based on the collision form estimated by the collision form estimation unit.

According to the second aspect, the collision form estimation unit estimates the collision form based on probabilities of collision with the object in a first region, a second region, and a third region. The first region is a region in front of the vehicle. The second region is a region shifted in a vehicle width direction so that the second region is on one side, for example, on the right side of the first region. The third region is a region shifted in the vehicle width direction so that the third region is on the other side, for example, on the left side of the first region.

According to the third aspect, the collision form estimation unit estimates the collision form based on the collision probability acquired using an electromagnetic wave radar sensor.

According to the fourth aspect, the collision form estimation unit estimates the collision form based on the collision probabilities acquired using a first millimeter wave radar sensor, a second millimeter wave radar sensor, and a third millimeter wave radar sensor. The first millimeter wave radar sensor is the electromagnetic wave radar sensor corresponding to the first region. The second millimeter wave radar sensor is the electromagnetic wave radar sensor corresponding to the second region. The third millimeter wave radar sensor is the electromagnetic wave radar sensor corresponding to the third region.

According to the fifth aspect, the driving control device is configured to drive the one or more occupant protection devices selected by the device selection unit in a certain case. The certain case is when a disconnection failure of the electromagnetic wave radar sensor due to an impact acting on the electromagnetic wave radar sensor upon collision between the vehicle and the object is detected.

According to the sixth aspect, the collision form estimation unit estimates the collision form based on a distance, direction, relative velocity, and collision probability acquired as the detection results. A distance is the distance between the vehicle and the object. A direction is the direction of the object from the vehicle. A relative velocity is the relative velocity between the vehicle and the object. Collision probability is the probability of collision with the object.

According to the seventh aspect, the driving control device is configured to drive the one or more occupant protection devices selected by the device selection unit when a built-in collision sensor and/or a satellite collision sensor detects a collision between the vehicle and the object. The built-in collision sensor is incorporated in the driving control device. The satellite collision sensor is provided separately from the driving control device.

According to the eighth aspect, the driving control device further includes an acceleration acquisition unit. The acceleration acquisition unit calculates an estimate of acceleration acting on the vehicle when the vehicle collides with the object based on the detection result. The driving control device is configured to drive the occupant protection device when the estimated value calculated by the acceleration acquisition unit exceeds a collision detecting threshold.

According to the ninth aspect, a driving control method for controlling driving of occupant protection devices to be mounted on a vehicle includes:

acquiring a detection result of an object ahead of the vehicle before collision; estimating a form of collision that may occur with the object based on the detection result; and when a collision between the vehicle and the object is detected, selecting which of the occupant protection devices should be driven based on the estimated collision form.

According to the tenth aspect, the driving control method estimates the collision form based on probabilities of collision with the object in a first region, a second region, and a third region. The first region is a region in front of the vehicle. The second region is a region shifted in a vehicle width direction so that the second region is on one side, for example, on the right side of the first region. The third region is a region shifted in the vehicle width direction so that the third region is on the other side, for example, on the left side of the first region.

According to the eleventh aspect, the driving control method estimates the collision form based on the collision probability acquired using an electromagnetic wave radar sensor.

According to the twelfth aspect, the driving control method estimates the collision form based on the collision probabilities acquired using a first millimeter wave radar sensor, a second millimeter wave radar sensor, and a third millimeter wave radar sensor. The first millimeter wave radar sensor is the electromagnetic wave radar sensor corresponding to the first region. The second millimeter wave radar sensor is the electromagnetic wave radar sensor corresponding to the second region. The third millimeter wave radar sensor is the electromagnetic wave radar sensor corresponding to the third region.

According to the thirteenth aspect, the driving control method drives the one or more selected occupant protection devices in a certain case in which a disconnection failure of the electromagnetic wave radar sensor due to an impact acting on the electromagnetic wave radar sensor upon collision between the vehicle and the object is detected.

According to the fourteenth aspect, the driving control method estimates the collision form based on a distance, direction, relative velocity, and collision probability acquired as the detection results. A distance is the distance between the vehicle and the object. A direction is the direction of the object from the vehicle. A relative velocity is the relative velocity between the vehicle and the object. Collision probability is the probability of collision with the object.

According to the fifteenth aspect, the driving control method drives the one or more selected occupant protection devices when a built-in collision sensor and/or a satellite collision sensor detects a collision between the vehicle and the object. The built-in collision sensor is incorporated in the driving control device. The satellite collision sensor is provided separately from the driving control device.

According to the sixteenth aspect, the driving control method further includes calculating an estimate of acceleration acting on the vehicle when the vehicle collides with the object based on the detection result. The driving control method drives at least one of the occupant protection devices when the estimated value calculated by the acceleration acquisition unit exceeds a collision detecting threshold.

According to the seventeenth aspect, a driving control device configured to control driving of an occupant protection device to be mounted on a vehicle includes a detection result acquisition unit, an acceleration acquisition unit, and a driving control device. The detection result acquisition unit acquires a detection result of an object ahead of the vehicle before collision. The acceleration acquisition unit calculates an estimate of acceleration acting on the vehicle when the vehicle collides with the object based on the detection result. The driving control device drives the occupant protection device when the estimated value calculated by the acceleration acquisition unit exceeds a collision detecting threshold.

According to the eighteenth aspect, the acceleration acquisition unit calculates the estimated value based on the detection result acquired using an electromagnetic wave radar sensor.

According to the nineteenth aspect, the acceleration acquisition unit calculates the estimated value based on the detection results acquired using a first millimeter wave radar sensor, a second millimeter wave radar sensor, and a third millimeter wave radar sensor. The first millimeter wave radar sensor is the electromagnetic wave radar sensor corresponding to the first region. The second millimeter wave radar sensor is the electromagnetic wave radar sensor corresponding to the second region. The third millimeter wave radar sensor is the electromagnetic wave radar sensor corresponding to the third region.

According to the twentieth aspect, the driving control device is configured to drive at least one of the occupant protection devices in a certain case. The certain case is when a disconnection failure of the electromagnetic wave radar sensor due to an impact acting on the electromagnetic wave radar sensor upon collision between the vehicle and the object is detected.

According to the twenty-first aspect, the driving control device is configured to drive at least one of the occupant protection devices when a built-in collision sensor and/or a satellite collision sensor detects a collision between the vehicle and the object. The built-in collision sensor is incorporated in the driving control device. The satellite collision sensor is provided separately from the driving control device.

According to the twenty-second aspect, a driving control method for controlling driving of occupant protection devices to be mounted on a vehicle includes:

acquiring a detection result of an object ahead of the vehicle before collision; calculating an estimate of acceleration acting on the vehicle when the vehicle collides with the object based on the detection result; and driving at least one of the occupant protection devices when the calculated estimate exceeds a collision detecting threshold.

According to the twenty-third aspect, the driving control method calculates the estimated value based on the detection result acquired using an electromagnetic wave radar sensor.

According to the twenty-fourth aspect, the driving control method calculates the estimated value based on the detection results acquired using a first millimeter wave radar sensor, a second millimeter wave radar sensor, and a third millimeter wave radar sensor. The first millimeter wave radar sensor is the electromagnetic wave radar sensor corresponding to the first region. The second millimeter wave radar sensor is the electromagnetic wave radar sensor corresponding to the second region. The third millimeter wave radar sensor is the electromagnetic wave radar sensor corresponding to the third region.

According to the twenty-fifth aspect, the driving control method drives at least one of the occupant protection devices in a certain case. The certain case is when a disconnection failure of the electromagnetic wave radar sensor due to an impact acting on the electromagnetic wave radar sensor upon collision between the vehicle and the object is detected.

According to the twenty-sixth aspect, the driving control method drives at least one of the occupant protection devices when a built-in collision sensor and/or a satellite collision sensor detects a collision between the vehicle and the object. The built-in collision sensor is incorporated in the driving control device. The satellite collision sensor is provided separately from the driving control device.

What is claimed is:

1. A driving control device configured to control driving of occupant protection devices configured to be mounted on a vehicle, comprising:
   a detection result acquisition unit which acquires a detection result of an object ahead of the vehicle before collision;
   a collision form estimation unit which estimates, as a collision form, a form of collision that may occur with the object based on the detection result;
   an acceleration acquisition unit which calculates an estimate of acceleration acting on the vehicle when the vehicle collides with the object based on the detection result; and
   a device selection unit which, when a collision between the vehicle and the object is detected, selects which of the occupant protection devices should be driven based on the collision form estimated by the collision form estimation unit, wherein
   the driving control device is configured to drive at least one of the occupant protection devices when the estimated value calculated by the acceleration acquisition unit exceeds a collision detecting threshold,
   the collision form estimation unit estimates the collision form based on probabilities of collision with the object in a first region in front of the vehicle, a second region on one side of the first region in a vehicle width direction, and a third region on the other side of the first region in the vehicle width direction,
   the collision form estimation unit estimates the collision form based on the probabilities of collision acquired using an electromagnetic wave radar sensor, and
   the driving control device is configured to drive the one or more occupant protection devices selected by the device selection unit when a disconnection failure of the electromagnetic wave radar sensor due to an impact acting on the electromagnetic wave radar sensor upon collision between the vehicle and the object is detected.

2. The driving control device according to claim 1, wherein
   the collision form estimation unit estimates the collision form based on the probabilities of collision acquired using a first millimeter wave radar sensor as the electromagnetic wave radar sensor corresponding to the first region, a second millimeter wave radar sensor as the electromagnetic wave radar sensor corresponding to the second region, and a third millimeter wave radar sensor as the electromagnetic wave radar sensor corresponding to the third region.

3. The driving control device according to claim 1, wherein
   the collision form estimation unit estimates the collision form based on a distance between the vehicle and the object, a direction of the object from the vehicle, a relative velocity between the vehicle and the object, and a probability of collision with the object acquired as the detection results.

4. The driving control device according to claim 1, wherein
   the driving control device is configured to drive the one or more occupant protection devices selected by the device selection unit when a built-in collision sensor provided in the driving control device, a satellite collision sensor provided separately from the driving control device, or a combination thereof, detects a collision between the vehicle and the object.

5. A driving control device configured to control driving of an occupant protection device to be mounted on a vehicle, comprising:
   a detection result acquisition unit which acquires a detection result of an object ahead of the vehicle before collision;
   an acceleration acquisition unit which calculates an estimate of acceleration acting on the vehicle when the vehicle collides with the object based on the detection result; and
   a driving control device which drives the occupant protection device when the estimated value calculated by the acceleration acquisition unit exceeds a collision detecting threshold, wherein
   the acceleration acquisition unit calculates the estimated value based on the detection result acquired using a first millimeter wave radar sensor as an electromagnetic wave radar sensor corresponding to a first region in front of the vehicle, a second millimeter wave radar sensor as an electromagnetic wave radar sensor corresponding to a second region on one side of the first region in a vehicle width direction, and a third millimeter wave radar sensor as the electromagnetic wave radar sensor corresponding to a third region on the other side of the first region in the vehicle width direction, and
   the driving control device is configured to drive the occupant protection device when a disconnection failure of the electromagnetic wave radar sensor due to an impact acting on the electromagnetic wave radar sensor upon collision between the vehicle and the object is detected.

6. The driving control device according to claim 5, wherein
   the driving control device is configured to drive the occupant protection device when a built-in collision sensor provided in the driving control device, a satellite collision sensor provided separately from the driving control device, or a combination thereof, detects a collision between the vehicle and the object.

* * * * *